(No Model.)  2 Sheets—Sheet 1.

S. L. ALLEN.
GRASS EDGER.

No. 464,950.  Patented Dec. 15, 1891.

Witnesses
Albert E. Leach
M. H. Thompson

Inventor
Samuel L. Allen
by Wm H. H. Brown
Atty.

(No Model.) 2 Sheets—Sheet 2.

S. L. ALLEN.
GRASS EDGER.

No. 464,950. Patented Dec. 15, 1891.

Witnesses
Albert E. Leach
M. H. Thompson

Inventor
Samuel L. Allen
by Wm. P. H. Downs
Atty

UNITED STATES PATENT OFFICE.

SAMUEL L. ALLEN, OF CINNAMINSON, NEW JERSEY.

GRASS-EDGER.

SPECIFICATION forming part of Letters Patent No. 464,950, dated December 15, 1891.

Application filed May 2, 1890. Serial No. 350,368. (No model.)

*To all whom it may concern:*

Be it known that I, SAMUEL L. ALLEN, a citizen of the United States, residing at Cinnaminson, in the county of Burlington and State of New Jersey, have invented certain new and useful Improvements in Grass-Edgers, of which the following is a full specification.

My invention consists of an improved agricultural hand implement for edging paths, roads, and drives, flower and shrub beds, &c., which is also useful for cutting strawberry vines and runners, the construction being such that the implement may be used either for simply clipping off the grass along the edges of old paths or beds and clearing away collected leaves or earth, or, in the case of new work, for slicing off the edge of the turf itself, forming a suitable verge, and at the same time cleaning and shaping the portion of the path or bed next to the verge or grass edge. Moreover, by removing the edging device the implement may be readily used for light hoeing and cultivating.

Figure 1:
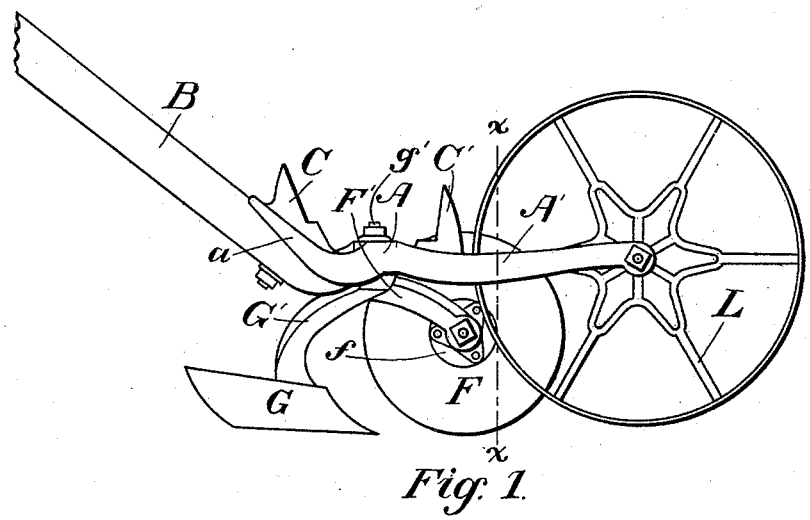
Figure 2:
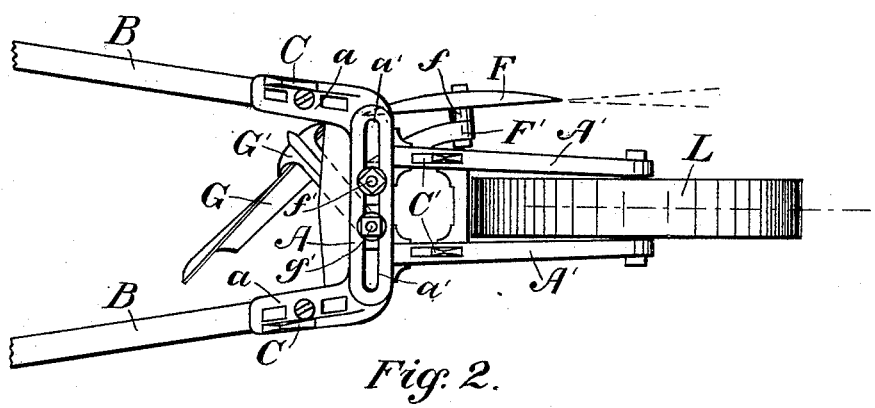
Figure 3:
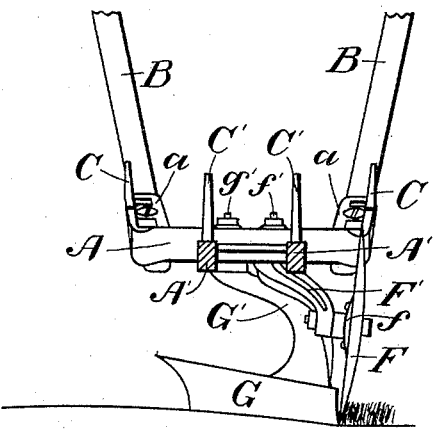
Figure 4:
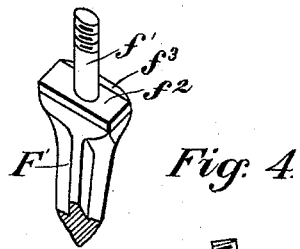
Figure 5:
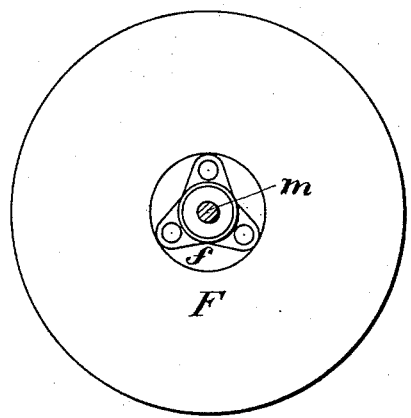
Figure 6:
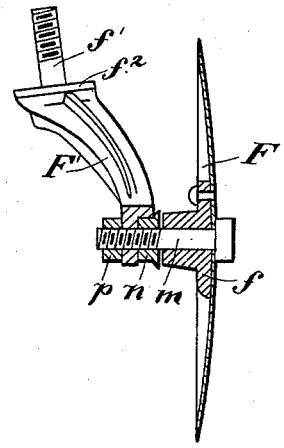

In the accompanying drawings, Figure 1 is a side elevation of my improved implement. Fig. 2 is a plan view of the same. Fig. 3 is a front view, partly in section, on the line $x\ x$, Fig. 1. Fig. 4 is an enlarged perspective view showing the top of the standard of the cutting-disk. Fig. 5 is an inside surface view of the cutting-disk; and Fig. 6 is a sectional view of the cutting-disk, taken through the axis thereof.

A is the slotted frame of the implement, having the forwardly-projecting arms A', between the forward ends of which pass the axle on which turns the wheel L, which supports the forward end of the implement.

$a\ a$ are wings extending outwardly and rearwardly from the frame, to which are secured the handles B, as shown. The part A of the frame has the slot $a'$ passing from one side to the other for containing the fastening-bolts projecting from the tops of the standards of the hoe and cutting-disks. The edging of the path or bed is accomplished by the combination of the adjustable hoe-blade G and the cutting-disk F, which latter consists of a thin circular plate dished or concaved, as shown in Fig. 6, and having a sharp cutting-edge all around its circumference. To its center is bolted or otherwise firmly secured the flange of the bearing-box $f$, which turns on an axle consisting, preferably, of the double-nutted bolt $m$. This bolt passes completely through the bearing-box and disk, the head of the bolt being on the outside of said disk. The nut $n$ is screwed up on the bolt $m$ sufficiently close to the bearing-box $f$ to allow the same to revolve freely on the bolt-axle, but without binding. The lower end of the standard F' fits over the square nut $n$ between which and the second nut $p$ the standard is firmly held. At the top of the curved standard F' is the flanged seat $f^3$, which bears against the bottom of the slotted frame, the raised portion $f^2$ fitting easily within the slot $a'$, thus determining the position of the cutting-disk, the fastening-bolt $f'$ being firmly held in the middle of the raised portion $f^2$. The whole is fastened in the slot of the frame at any position laterally by means of a nut at the top thereof screwed down upon the bolt $f'$.

G is a hoe-blade secured to the standard G', at the top of which is a similarly-constructed fastening arrangement to that on the standard F', capped by the fastening-bolt $g'$, both standards F' and G' being so curved or twisted that when properly seated together in the slot $a'$ and fastened therein the blade of the hoe and the disk of the cutter shall occupy the proper position relative to each other. For instance, when, as ordinarily, the two tools are secured in the slot $a'$ of the frame in the manner shown in the drawings, with the tops of the standards as close together as possible, the cutting-disk F will not be parallel to the line of motion of the implement, but so placed that a horizontal line across the inner face of the cutting-disk will point forward somewhat to the left of the line of motion, as indicated by the dotted line in Fig. 2, and the hoe-blade G will be inclined in the position best shown in Fig. 2, with the outer lower edge of the same directly behind the bottom of the cutting-disk, as shown in Fig. 3. In this position the hoe sweeps out toward the middle of the path the grass or turf as fast as it is cut by the disk F, together with whatever leaves and rubbish may be collected there. The disk F, furthermore, is not held vertically, but inclines outward at the top, as shown in Fig. 3, enabling the implement to make a slanting cut along the edge of the turf, while the concavity of the disk enables it to edge as neatly around an inward or concave curve as in a perfectly-straight line or convex curve. It is to further aid in cutting both inward and outward curves as well as straight work that the standard F' is so arranged, as above described, that when fastened in the slot a horizontal line across the inner face of the disk F points forward to the left of the line of motion, while the forward half of the concave disk is nearly parallel to the line of motion, as shown in Fig. 2. For ordinary work the tops of the standards of both hoe and cutting-disk are placed together in contact, as shown in Fig. 2. This will always bring the hoe into the right position relative to the disk. Both standards may be moved laterally in the slot and fastened at any portion thereof; but both should ordinarily be in contact. Moreover, the hoe-blade G is preferably so set on its standard, as shown in Fig. 3, that its bottom is not horizontal, but conforms to the curve or slant generally found in paths or beds. The cutting-disk standard is so shaped, moreover, that when desired it may be reversed so as to make the disk follow along behind the frame A instead of preceding it. This is sometimes desirable for cutting strawberry-runners, &c.

The implement, when used to keep the paths constantly in order, is intended to clip off from time to time simply the grass that encroaches upon the intended line of the path rather than to slice off the edge of the turf itself, as constant cutting away of the turf would injuriously widen the path.

The frame as ordinarily constructed is made strong and heavy enough for all ordinary clipping of the grass along the path edge. When, however, the edger is to be used in laying out new walks or beds, the work is harder, often requiring a heavy cut of the turf itself. For this purpose I provide the frame with upward projections C C', which form a sort of skeleton frame or receptacle wherein a stone or brick or weight of any kind may be conveniently held to give any needed additional weight for effectual service.

The implement is equally adapted for cutting off strawberry-vines and surplus runners and hoeing at the same time; or, if desired, the hoe may be removed and the cutting-disk alone used. On the other hand, by removing the cutting-disk and using the hoe alone the implement serves as a very efficient light cultivator.

While I prefer to secure the disk and hoe to the frame by means of separate standards, each having a seat and a fastening-bolt engaging with a slot in the frame, I might, if desired, have the tool-standards directly cast with the frame to form a part thereof. Moreover, while these drawings and description refer only to an edger for hand use, I use the same arrangement for horse-power also.

I claim—

1. A grass-edger having a frame provided with upward projections C C', whereby a skeleton receptacle is formed thereon, substantially as and for the purposes described.

2. In a grass-edger, the combination, with a wheel-supported frame provided with a slot at right angles with the line of motion, of a cutting-disk and hoe having standards, each of said standards being provided with a flanged top and seat engaging with the frame-slot, said standard being also curved in a manner whereby when the standards are fastened in the slot at any desired lateral position therein, but with their tops in contact, the outer lower edge of the hoe is always directly behind the bottom of the cutting-disk and the hoe is at the proper angle to the disk, substantially as and for the purposes described.

In witness whereof I have hereunto set my hand.

SAMUEL L. ALLEN.

Witnesses:
  WM. H. ROBERTS,
  EDWARD W. BURT.